(12) United States Patent
Gavrilov et al.

(10) Patent No.: US 11,878,916 B2
(45) Date of Patent: Jan. 23, 2024

(54) MANGANESE OXIDE COMPOSITION OF MATTER, AND SYNTHESIS AND USE THEREOF

(71) Applicant: Ionic Materials, Inc., Woburn, MA (US)

(72) Inventors: Alexei B. Gavrilov, Woburn, MA (US); Andrew Leitner, Woburn, MA (US)

(73) Assignee: IONIC MATERIALS, INC., Woburn, MA (US)

( * ) Notice: Subject to any disclaimer, the term of this patent is extended or adjusted under 35 U.S.C. 154(b) by 632 days.

(21) Appl. No.: 17/251,971

(22) PCT Filed: Jun. 20, 2019

(86) PCT No.: PCT/US2019/038190
§ 371 (c)(1),
(2) Date: Dec. 14, 2020

(87) PCT Pub. No.: WO2020/005700
PCT Pub. Date: Jan. 2, 2020

(65) Prior Publication Data
US 2021/0253443 A1 Aug. 19, 2021

Related U.S. Application Data

(60) Provisional application No. 62/689,515, filed on Jun. 25, 2018.

(51) Int. Cl.
*C01G 45/02* (2006.01)
*H01M 4/50* (2010.01)
*H01M 4/02* (2006.01)

(52) U.S. Cl.
CPC ............ *C01G 45/02* (2013.01); *H01M 4/502* (2013.01); *C01P 2002/20* (2013.01); *C01P 2002/30* (2013.01); *C01P 2002/72* (2013.01); *C01P 2002/76* (2013.01); *C01P 2002/77* (2013.01); *C01P 2004/03* (2013.01); *C01P 2006/40* (2013.01); *H01M 2004/028* (2013.01)

(58) Field of Classification Search
CPC ............................... C01G 45/02; H01M 4/502
See application file for complete search history.

(56) References Cited

U.S. PATENT DOCUMENTS

| | | |
|---|---|---|
| 4,405,699 A | 9/1983 | Kruger |
| 5,378,560 A | 1/1995 | Tomiyama |
| 5,917,693 A | 6/1999 | Kono et al. |
| 5,989,742 A | 11/1999 | Cabasso et al. |
| 6,455,202 B1 | 9/2002 | Marugan et al. |
| 10,553,901 B2 | 2/2020 | Zimmerman et al. |
| 2003/0013012 A1 | 1/2003 | Ahn et al. |
| 2005/0164085 A1 | 7/2005 | Bofinger et al. |
| 2011/0044887 A1 | 2/2011 | Amos et al. |
| 2011/0111287 A1 | 5/2011 | Sayre et al. |
| 2013/0136981 A1 | 5/2013 | Peuchert et al. |
| 2014/0004431 A1 | 1/2014 | Yamaguchi et al. |
| 2014/0079995 A1 | 3/2014 | Wakada |
| 2015/0364791 A1 | 12/2015 | Vu et al. |
| 2016/0028133 A1 | 1/2016 | Miles |
| 2016/0118685 A1 | 4/2016 | Zhang et al. |
| 2018/0134576 A1* | 5/2018 | Rebmann ............ C01B 21/0461 |
| 2018/0219210 A1 | 8/2018 | Kim |

FOREIGN PATENT DOCUMENTS

| | | |
|---|---|---|
| CN | 107709243 A | 2/2018 |
| JP | 2005/535076 A | 11/2005 |
| WO | 2016/196873 A1 | 12/2016 |
| WO | 2019/065066 A1 | 4/2019 |

OTHER PUBLICATIONS

Ardizzone et al., "Mn3O4 and y-MnOOH powders, preparation, phase composition and XPS characterisation," Colloids and Surfaces, vol. 134, 1998, pp. 305-312.
Sun et al., "Preparation and characterization of MnOOH and B—MnO2 whiskers," Inorganic Chemistry Communications, vol. 5, 2002, pp. 747-750.
Lefkowitz et al., "Influence of pH on the Reductive Transformation of Birnessite by Aqueous Mn(II)," Environmental Science & Technology, vol. 47, 2013, pp. 10364-10371.
Persson et al., "Materials Data on MnO2 (SG:164) by Materials Project," database entry #mp-25558, Nov. 2014 [Per International Search Report dated Oct. 2, 2019, Perssson et al. document retrieved Aug. 20, 2019 via <https://doi.org/10.17188/1200755>].
Wang et al., "The effects of Mn loading on the structure and ozone decomposition activity of MnOx supported on activated carbon," Chinese Journal of Catalysis, vol. 35, No. 3, Mar. 2014, pp. 335-341.
Yu et al., "Solution-combusion synthesis of epsilon-MnO2 for supercapacitors," Materials Letters, vol. 64, available online Oct. 9, 2009, pp. 61-64.
International Search Report and Written Opinion of the International Searching Authority, dated Oct. 2, 2019, for parent application PCT/US2019/038190, filed Jun. 20, 2019.
Hunter, et al., "Preparation of a New Crystal Form of Manganese Dioxide MnO2," Journal of Solid State Chemistry, vol. 39. No. 2, Sep. 1, 1981 (Sep. 1, 1981), pp. 142-147.
Leong, et al., "A Study of MnO2 with Different Crystalline Forms of Pseudocapacitive Desalination," Applied Materials & Interfaces, vol. 11, No. 14, Feb. 14, 2019 (Feb. 14, 2019), pp. 13176-13184.
Persson, et al., "Materials Data on MnO2 (SG:164) by Materials Project," mp-25558, Nov. 2014, (Nov. 2014), 9 pages.

* cited by examiner

*Primary Examiner* — Yong L Chu
(74) *Attorney, Agent, or Firm* — Burns & Levinson, LLP; Joseph M. Maraia (57) ABSTRACT

The present invention relates to a new synthetic manganese oxide material, a method of synthesis of the new manganese oxide material, and use of the new synthetic manganese oxide as a secondary battery active cathode material in an electrochemical application.

9 Claims, 7 Drawing Sheets

MANGANESE OXIDE COMPOSITION OF MATTER, AND SYNTHESIS AND USE THEREOF

STATEMENT REGARDING FEDERALLY SPONSORED RESEARCH OR DEVELOPMENT

Not Applicable.

BACKGROUND OF THE INVENTION

This invention relates to a new synthetic Manganese Oxide material τ-MnO$_2$, a method of synthesis of the new material τ-MnO$_2$, and use of the new synthetic Manganese Oxide τ-MnO$_2$ as a secondary battery active cathode material in an electrochemical application.

Manganese oxides of general formula MnO$_{2-x}$ have a variety of applications, including but not limited to pigments/coloring agents, components to produce specialty alloys, catalysts, water purifying agents, and oxidants in organic synthesis. Energy storage applications such as Li and Li-ion batteries, supercapacitors and alkaline (primary) batteries have increasingly dominated the MnO$_{2-x}$ market.

Traditional alkaline batteries commonly employ electrolytic manganese dioxide (EMD) as the active material in the cathode. The EMD structure or γ-MnO$_2$ is generally described as an intergrowth of Ramsdellite (R—MnO$_2$) and Pyrolusite ((β-MnO$_2$) tunnel MnO$_2$ phases with a considerable amount of defects in the crystalline lattice.

During battery discharge and reduction of the EMD, protons intercalate into the tunnel manganese oxide structures forming a MnOOH$_X$ solid solution, which preserves the tunnel structure of the starting manganese oxide. The final product for traditional 1-electron reduction of Mn(IV) to Mn(III) is δ-MnOOH. Theoretically, this δ-MnOOH can be further reduced to Mn(OH)$_2$. In practice, however, the dissolution-precipitation mechanism which results in the formation of spinels Hausmannite (Mn$_3$O$_4$) and Hetaerolite (ZnMn$_2$O$_4$) is more favorable (References: A. Kozawa, J. F. Yeager, JES, 1965, 959-963; D. Im, A. Manthiram, B. Coffey, JES 2003, A165159; D. Boden et al, JES 1967, 415-417; Bode et al, JES 1997, 792-801; C. Mandoloni et al, JES, 1992, 954-59; M. R. Bailey, S. W. Donne, JES, 2012, A2010-15).

Structural differences between tunnel manganese(III) oxy-hydroxide and layered manganese(II) hydroxide may be the reason why the second electron transferred is hindered. Restoring the original tunnel manganese oxide structure during charge or oxidation is also problematic.

BRIEF SUMMARY OF THE INVENTION

In one aspect, the present invention features a composition of matter including a material having a general formula of MnO$_{2-x}$; wherein x is in a range of 0 to 0.35; wherein the material is crystalline; and wherein the material has an X-ray diffraction pattern according to the following table:

| 2 Theta (+/−0.20) | Relative Intensity |
| --- | --- |
| 19.74 | Strong |
| 36.93 | Very Strong |
| 40.16 | Weak |
| 42.28 | Strong |
| 56.43 | Strong |
| 62.00 | Weak |
| 66.68 | Medium |

In an embodiment of this aspect of the invention, the material has a space grouping of P3̄m1.

In another embodiment of this aspect of the invention, the material has a distance between manganese atoms in the c-direction of about 4.487 Angstroms.

In another aspect, the present invention features a method of preparing a crystalline material including manganese and oxygen, the method including a step of contacting a solid β-MnOOH with a component selected from the group consisting of an ozone species, a radical oxygen species, and a combination of the aforementioned species, in an absence of water, said crystalline material having after the contacting step an X-ray pattern according to the following table:

| 2 Theta (+/−0.20) | Relative Intensity |
| --- | --- |
| 19.74 | Strong |
| 36.93 | Very Strong |
| 40.16 | Weak |
| 42.28 | Strong |
| 56.43 | Strong |
| 62.00 | Weak |
| 66.68 | Medium |

In an embodiment of this method, the crystalline material has a space grouping of P3̄m1.

In another embodiment of the method, the crystalline material has a distance between manganese atoms in the c-direction of about 4.487 Angstroms.

In another aspect, the invention features a composition of matter including a material defined by a general formula MnO$_{2-x}$, where x in in a range of 0 to 0.35; wherein the material is crystalline, and wherein the material has a space grouping of P3̄m1.

In an embodiment of this aspect of the invention, the material has a distance between manganese atoms in the c-direction of about 4.487 Angstroms.

In another aspect, the present invention features a method of preparing a crystalline material including manganese and oxygen, the method including the steps of contacting a solid β-MnOOH species with a component selected from the group consisting of an ozone species, a radical oxygen species, and a combination of the aforementioned species, in an absence of water, said crystalline material after the contacting step being defined by a general formula MnO$_{2-x}$, where x in in a range of 0 to 0.35; and wherein the crystalline material has a space grouping of P3̄m1.

These and other aspects, features, advantages, and objects will be further understood and appreciated by those skilled in the art by reference to the following specification, claims and appended drawings.

BRIEF DESCRIPTION OF THE SEVERAL VIEWS OF THE DRAWINGS

The appended drawings support the detailed description of the invention and refer to exemplary embodiments. The appended drawings are considered to be in no way limiting to the full scope of the invention.

In the drawings.

DETAILED DESCRIPTION OF THE INVENTION

Figure 1:
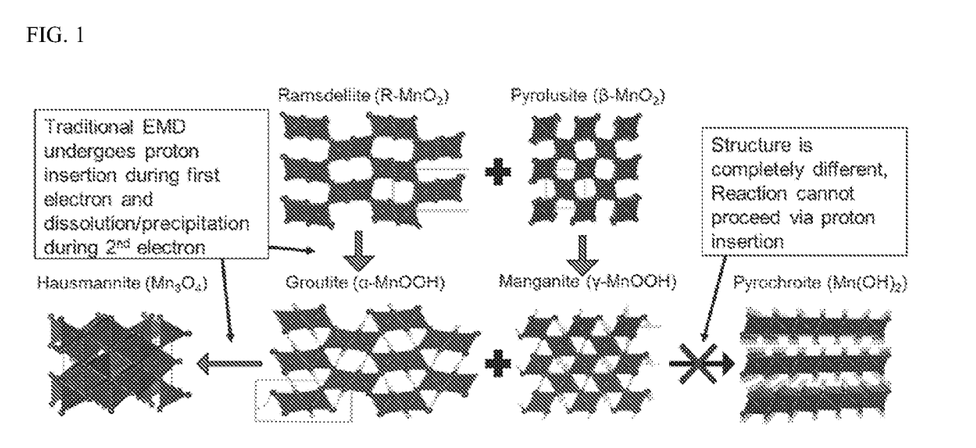
FIG. 1 shows crystalline lattice structures for Ramsdellite and Pyrolusite manganese dioxide materials.

The EMD or γ-Manganese Oxide is an intergrowth of Ramsdellite (1×2 channels) and Pyrolusite (1×1 channels) phases. FIG. 1 shows the crystalline lattice structures of both Ramsdellite and Pyrolusite phases. The channels of each are formed by corner sharing atoms. The different crystalline structures react differently when undergoing proton insertion during their electrochemical reduction. The Ramsdellite phase is reduced to a Groutite, and the Pyrolusite phase is reduced to Manganite. Further reduction of the tunnel MnOOH to Mn(II) should form Pyrochroite, which has a completely different layered crystal structure. The structural rearrangement of the tunnel phase, either Groutite or Manganite, may impose an energy barrier preventing discharge to Mn(II) at meaningful voltage. Re-forming the original tunnel material from the layered structure, Pyrochroite, is also problematic, which negatively impacts cyclability.

Figure 2:
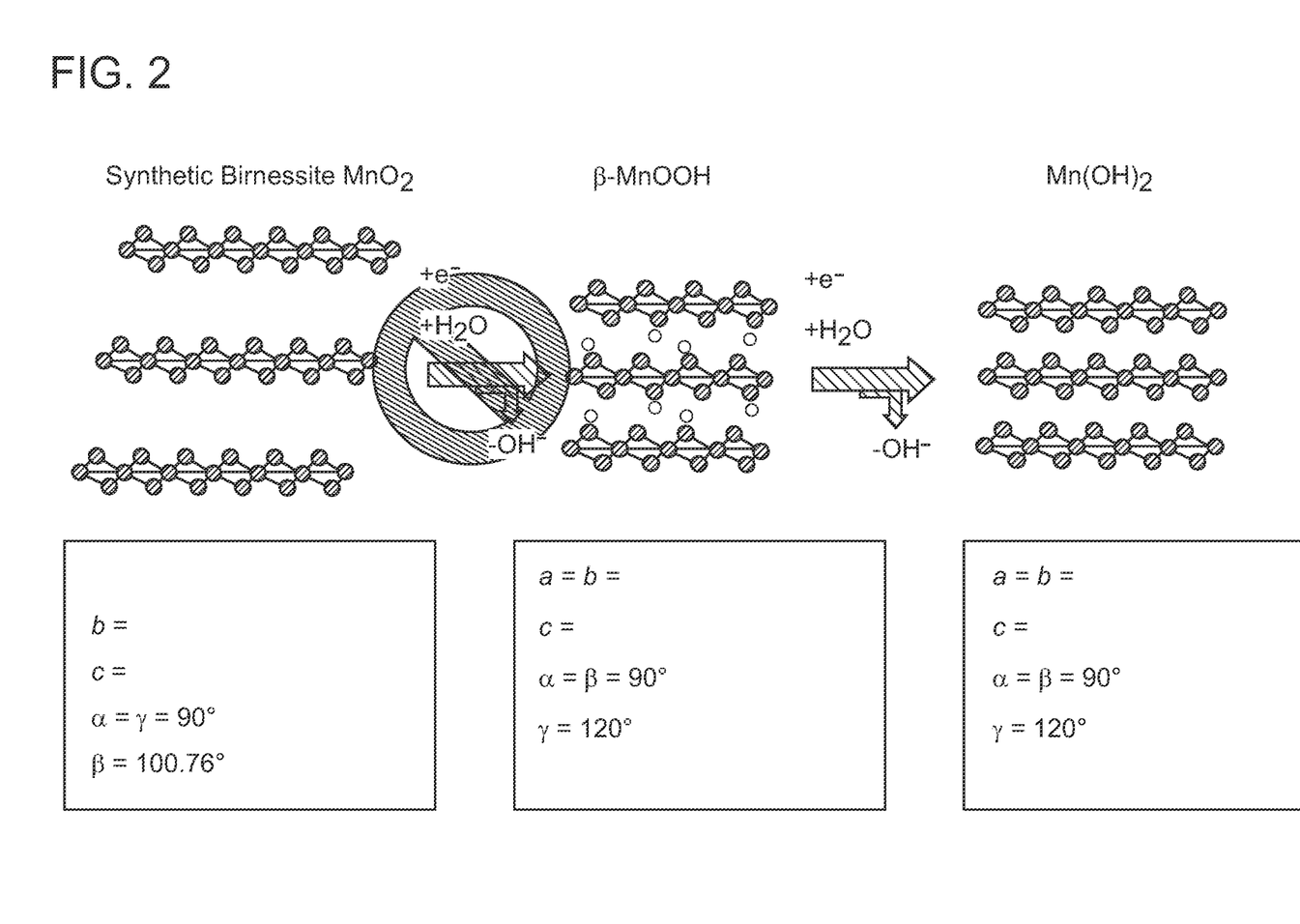
FIG. 2 shows a synthetic Birnessite structure as compared to β-MnOOH and Mn(OH)$_2$ structures.

Dissolution of Mn(III) species with subsequent precipitation of stable (inactive) phases, such as Hausmannite seems more favorable, thus limiting tunnel MnO$_2$ discharge to 1.33 electrons per Mn (A. Kozawa, J. F. Yeager, JES, 1965, 959-963; D. Im, A. Manthiram, B. Coffey, JES 2003, A1651-59; D. Boden et al, JES 1967, 415-417; Bode et al, JES 1997, 792-801; C. Mandoloni et al, JES, 1992, 954-59; M. R. Bailey, S. W. Donne, JES, 2012, A2010-15). Layered manganese oxides, such as synthetic Birnessite have been also studied for battery applications. FIG. 2 shows the synthetic Birnessite structure is substantially different from manganese hydroxide, most notably in d-spacing, symmetry, presence of interlayer species and hydration. Birnessite reduction usually occurs in two distinct steps, with the 2nd electron being transferred at a voltage too low for practical applications (e.g. less than 0.8V). Synthetic Birnessite does not form β-MnOOH and subsequently Mn(OH)$_2$ upon discharge in a Zn/MnO$_2$ cell. Synthetic Birnessite is also prone to forming more stable phases upon discharge, such as the tunnel structures and spinels. (Manthiram, J. Electrochem. Soc. 149 (4) A483, 2002; Swinkels, J. Electrochem. Soc. 144 (9) 2949, 1997; Yadav/Banerjee Nature Communications 2017, 8 14424).

Figure 3:
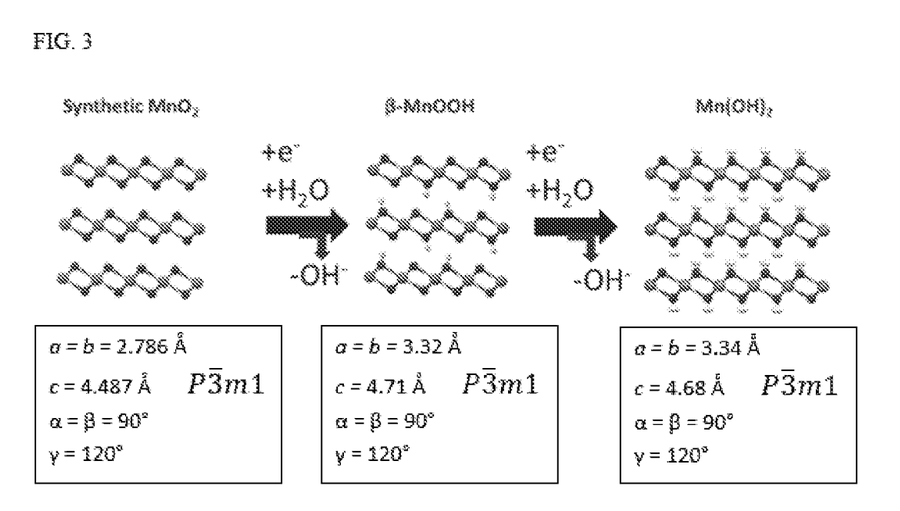
FIG. 3 shows a synthetic MnO$_2$ structure according to an ideal desired structure and β-MnOOH and Mn(OH)$_2$ structures.

In an aspect of the invention, layered manganese(IV) oxide isostructural to the manganese(II) hydroxide is desired to facilitate 2nd electron transfer and facilitate rechargeability. The space group description for the desired layered manganese(IV) oxide is trigonal crystal system (bravais lattice) with a P$\bar{3}$m1 space group (#164 international short symbol). FIG. 3 shows the β-MnOOH and manganese hydroxide from FIG. 2 in comparison with an ideal desired synthetic layered manganese(IV) oxide which is isostructural to both the β-MnOOH and manganese hydroxide. The similar structures of the synthetic layered manganese(IV) oxide and the β-MnOOH and manganese hydroxide structures allows for oxidation to manganese(IV) from the manganese(III) and manganese(II) oxides.

Traditionally, manganese oxides are synthesized by oxidation of Mn(II) salts or decomposition of permanganates. However, these routes lead exclusively to a thermodynamically more stable tunnel or Birnessite structures. Spontaneous oxidation of manganese hydroxide by oxygen, as well as attempts to oxidize β-MnOOH by soluble oxidants result in formation of Manganosite, Bixbyite, Hausmannite, Birnessite or no change in structure or oxidation state. No method to synthesize ideal layered manganese(IV) oxide structures is available in the prior art.

Example 1

Oxidation of β-MnOOH was performed in multiple ways according to methods described in Table 1. The dissolved oxidant and observed result are also described in Table 1.

TABLE 1

| | Approach | Outcome |
|---|---|---|
| A | Mix 1 mmol KMnO$_4$ or NaMnO$_4$ dissolved in 500 mL water with 3 mmol of β-MnOOH to create a suspension for 1 hour. | Birnessite + Hausmannite |
| B | Mix 1 mmol KMnO$_4$ or NaMnO$_4$ dissolved in 500 mL water with 3 mmol of β-MnOOH to create a suspension. Raise pH to 10 for 1 hour. | Birnessite + Hausmannite |
| C | Mix 2 mmol of 30% H$_2$O$_2$ with suspension of 1 mmol β-MnOOH in 500 mL water for 1 hour. | No Reaction |
| D | Mix 2 mmol of 30% H$_2$O$_2$ with suspension of 1 mmol β-MnOOH in 500 mL water. Raise pH to 10 for 1 hour. | No Reaction |
| E | Mix 1 mmol K$_2$S$_2$O$_8$ or Na$_2$S$_2$O$_8$ or (NH$_4$)$_2$S$_2$O$_8$ dissolved in 500 mL water with 1 mmol β-MnOOH to create a suspension for 1 hour. | Hausmannite |
| F | Mix 1 mmol K$_2$S$_2$O$_8$ or Na$_2$S$_2$O$_8$ or (NH$_4$)$_2$S$_2$O$_8$ dissolved in 500 mL water with 1 mmol β-MnOOH to create a suspension. Raise pH to 10 for 1 hour. | Hausmannite |
| G | Mix 1 mmol 10% NaClO with 1 mmol β-MnOOH in 500 mL water to create a suspension for 1 hour. | Hausmannite |
| H | Mix 1 mmol 10% LiClO$_4$ with 1 mmol β-MnOOH in 500 mL water to create a suspension for 1 hour. | Hausmannite |

TABLE 1-continued

| Approach | | Outcome |
|---|---|---|
| I | Mix 1 mmol DDQ (2,3-Dichloro-5,6-dicyano-1,4-benzoquinone) or Chloranil or Oxone in 500 mL DCM (Dichloromethane) or NMP (N-Methyl-2-pyrrolidone) or Acetonitrile or DMF (Dimethylformamide) with 2 mmol β-MnOOH to create a suspension for 1 hour. | No Reaction |
| J | Mix 1 mmol DDQ or Chloranil or Oxone in 500 mL of DCM or NMP or Acetonitrile or DMF with 2 mmol of β-MnOOH under refluxing conditions for 1 hour. | No Reaction |
| K | Mix 1 mmol 30% $HClO_4$ with suspension of 1 mmol β-MnOOH in 500 mL water and bubble in 2 mmol $O_3$ | Nsutite $^{Faber\ et\ al.}$ |

Example 2

The new synthetic manganese oxide material τ-$MnO_2$ was synthesized by oxidation of anhydrous solid β-MnOOH powder with a dry ozone/oxygen gas mixture. For each gram of β-MnOOH, 5 grams of a 10% ozone gas was added. The reaction was performed at 25° C. and pressure of 1 atmosphere. After 2 molar equivalents of ozone were passed through the reaction vessel, the powder changed color from metallic brown to dull gray.

The mechanism of ozone oxidation can involve direct interaction or proceed via radical oxygen intermediates. In the latter case, other gasses containing or producing radical oxygen species can be used in place of ozone (oxygen plasma, OH, gaseous peroxide species, etc.).

Oxidation of Mn(III) to Mn(IV) was confirmed by titration with Ferrous Sulfate, indicating the 4.0 average oxidation state. The titration was performed according to the method described in [Katz. (J., Nye, W. F., & Clarke, R. C. (1956). Available Oxygen in Manganese Dioxide. *Analytical Chemistry*, 28(4), 507-508. https://doi.org/10.1021/ac50161a028)]. This method is hereby incorporated in its entirety herein by reference.

A Powder X-ray diffraction (PXRD) analysis of the new synthesized manganese oxide powder τ-$MnO_2$ was performed on a Panalytical Empyrean diffractometer with Cu K-α radiation operating at 45 kV and 40 mA. The sample was scanned from 10-70° 2θ with a step size of 0.141° at a rate of 0.0090 steps per second.

Figure 4:
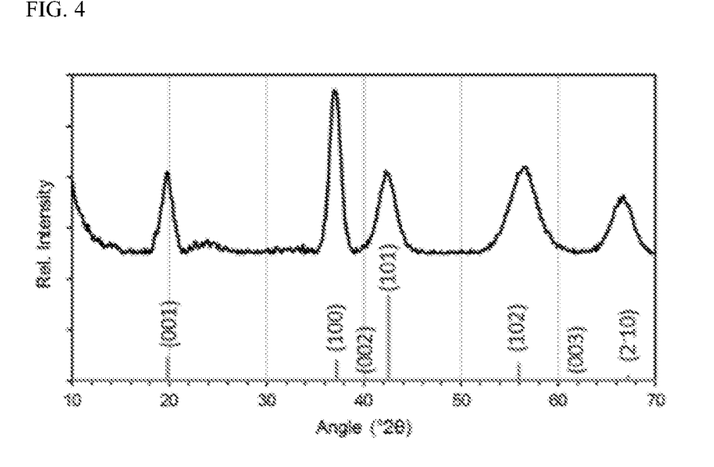
FIG. 4 shows an X-Ray Diffraction Analysis for a new synthetic manganese oxide material τ-MnO$_2$ according to a non-limiting embodiment of the invention as compared to an expected peak position for an ideal structure.

FIG. 4 shows the X-ray diffraction (XRD) pattern for the new synthetic manganese oxide material τ-$MnO_2$ as compared to expected peak positions for a desired ideal layered structure as shown by the theoretical XRD vertical lines.

The XRD pattern shown in FIG. 4 for the new synthetic manganese oxide material i-$MnO_2$ does not fit XRD patterns for α-$MnO_2$ (Cryptomelane), β-$MnO_2$(Pyrolusite), R—$MnO_2$ (Ramsdellite), γ-$MnO_2$(EMD), ε-$MnO_2$ (Ahktenskite), δ-$MnO_2$ (Birnessite/Buserite), or λ-$MnO_2$ (Spinel).

The XRD pattern shown in FIG. 4 for the new synthetic manganese oxide material i-$MnO_2$ shows an excellent fit to the theoretical XRD lines simulated for a desired ideal layered structure, iso-structural to manganese hydroxide P$\bar{3}$m1 space group (#164 international short symbol)). The theoretical XRD lines for the ideal layered $MnO_2$ crystal structure were created in VESTA, using the cif file for $TiS_2$ as a starting point. $TiS_2$ was used because $TiS_2$ has a 2D layered structure with the stoichiometry of atoms similar to $Mn(OH)_2$, has no interlayer species and occupies the same space group as $Mn(OH)_2$. First, the structure parameters were changed so that the electron densities for Ti were changed to those of Mn and the electron densities for S were changed to O. Next, the bond distances were changed to reflect manganese in the 4+ oxidation state. With respect to other $MnO_2$ compounds, the average bond length for $Mn^{4+}$ is 1.95 Å. After the structure was complete, a powder pattern was simulated and is shown in FIG. 4.

The excellent fit between the XRD pattern for the new synthetic manganese oxide τ-$MnO_2$ structure and the theoretical vertical XRD lines of the ideal layered $MnO_2$ crystal structure confirms that the new synthetic τ-$MnO_2$ has the same space group and atomic connectivity as the starting structure of layered β-MnOOH and $Mn(OH)_2$. Changes in the charge of the manganese cation from 3+ to 4+ results in a decrease in bond distances while retaining the same bond structure and symmetry. FIG. 4 shows a major PXRD 2 Theta peak is found at 37 degrees, and other peaks are found at 20, 42, 56, and 67 degrees. The space grouping (international short symbol) is P$\bar{3}$m1, and number 164. The following table shows the data of FIG. 4 including both relative and normalized intensities as follows:

| 2 Theta (±0.20) | Relative Intensity | Normalized Intensity |
|---|---|---|
| 19.74 | Strong | 49.8 |
| 36.93 | Very Strong | 100.0 |
| 40.16 | Weak | 5.3 |
| 42.28 | Strong | 50.4 |
| 56.43 | Strong | 53.1 |
| 62.00 | Weak | 1.4 |
| 66.68 | Medium | 35.4 |

The dimensionality of a structure can be defined by the bond connectivity within the crystallographic supercell. For a 3D structure, strong chemical bonds such as ionic, covalent and metallic bonds are formed between atoms in all 3 dimensions while any weak chemical bonds such as Van der Waals forces and hydrogen bonding do not contribute to the atomic connectivity of the supercell. For a 2D structure, strong chemical bonds are formed between atoms in two dimensions while any weak chemical bonds contribute to the atomic connectivity of the remaining dimension of the supercell. For a 1D structure, strong chemical bonds are formed between atoms along one dimension while any weak chemical bonds contribute to the atomic connectivity in the remaining two dimensions of the supercell. Good examples of 3D, 2D and 1D structures are diamond, graphene and polyacetylene respectively.

The structure of the new synthesized manganese oxide material τ-$MnO_2$ consists of strong Mn—O bonds connected in two dimensions (the a and b axes of the crystallographic unit cell). The third dimension (c axis) being held together solely by Van der Waals interactions. There are no interlayer species such as water molecules or ions between the layers of new synthesized manganese oxide material τ-$MnO_2$. The layers of new synthesized manganese material τ-$MnO_2$ are aligned; they are symmetrically stacked in the same way as Pyrochroite. In contrast, the layers of Birnessites are staggered from one another, which is reflected in the different space group, and the Birnessites typically have interlayer species including, but not limited to water molecules and ions.

Figure 5:
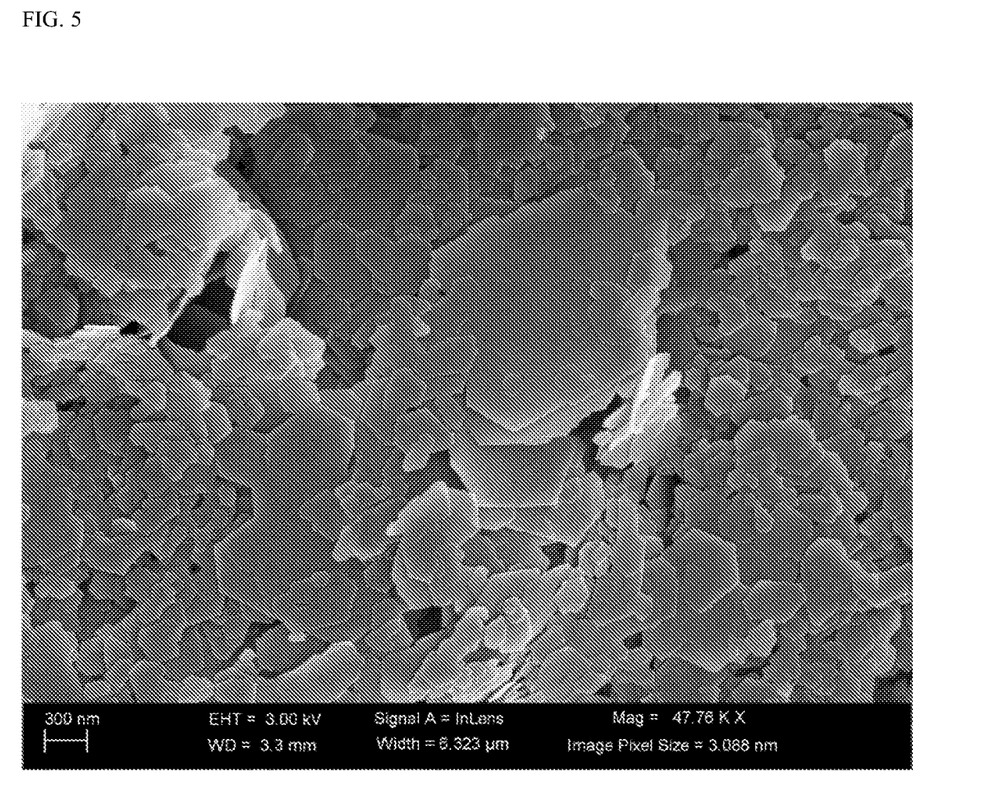
FIG. 5 shows a scanning electron micrograph (SEM) image of a new synthetic manganese oxide material τ-MnO$_2$ according to a non-limiting embodiment of the invention.

The scanning electron microscopy (SEM) image of FIG. 5 elucidates the morphology of the new synthetic manganese oxide material τ-$MnO_2$. The new synthetic manganese oxide material τ-$MnO_2$ material has a sheet-like morphology. The sheets are roughly 10-50 nanometers thick and between 50 and 600 nanometers in length and width. The sheets adopt a hexagonal pattern with 120° angles between edges, which is corroborated by the PXRD and ideal crystal structure.

Example 3

Cathodes made with the new synthetic τ-manganese oxide material τ-$MnO_2$ were evaluated in standard 2032 coin cells using a Zn powder anode and a commercial NKK separator soaked with 2M zinc sulfate aqueous solution containing 0.1M manganese sulfate.

Cathodes and anodes for the coin cells were slurry-casted using NMP solvent and PVDF binder. Appropriate amount of carbon was added for electronic conductivity.

Figure 6:
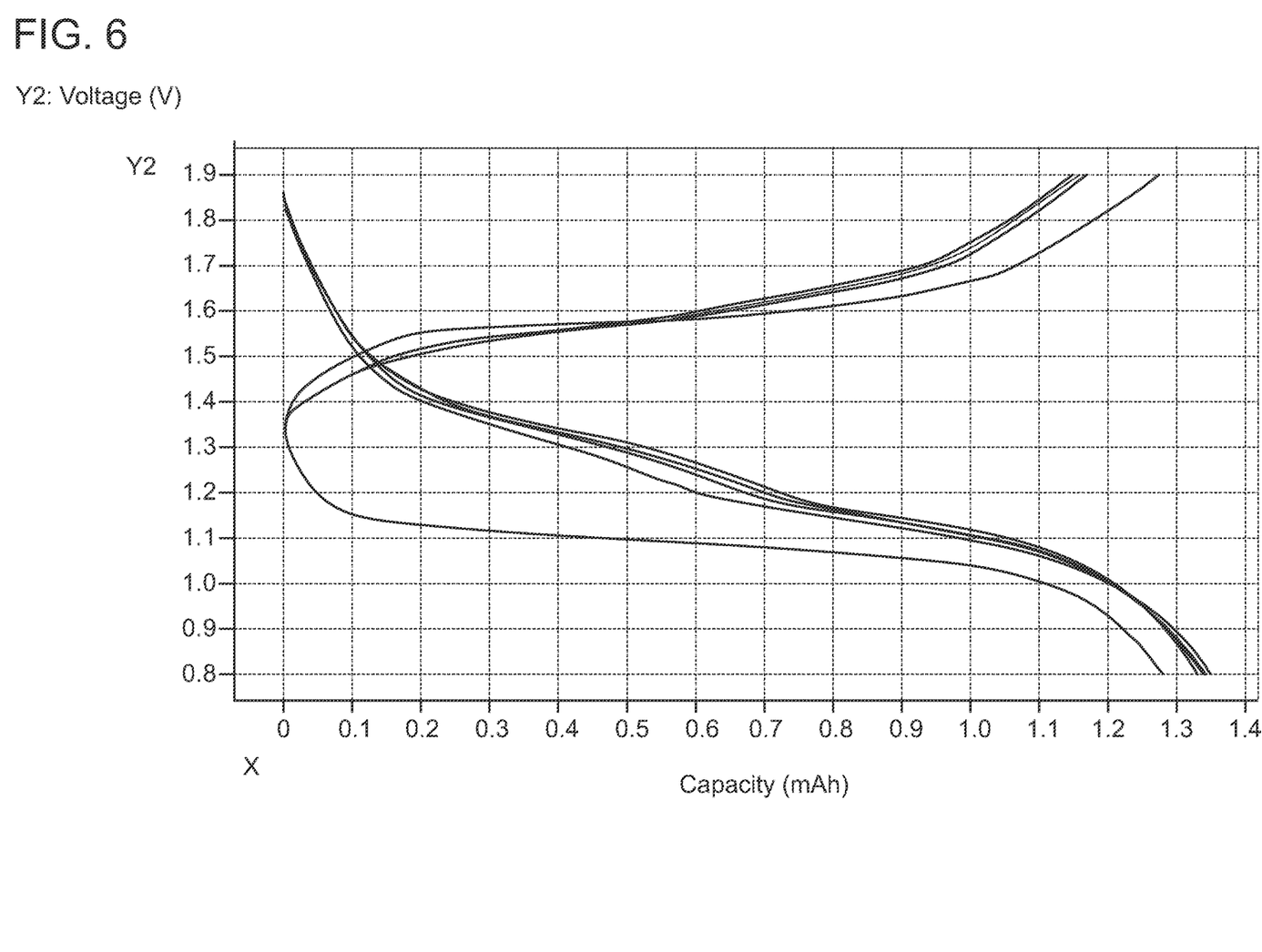
FIG. 6 shows a voltage profile for a 2032 coil cell manufactured with a secondary battery active cathode material including a new synthetic manganese oxide τ-MnO$_2$ according to a non-limiting embodiment of the invention.
Figure 7:
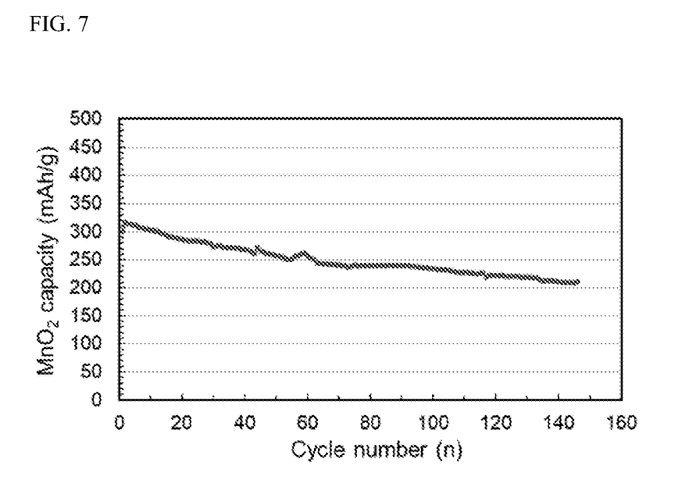
FIG. 7 shows MnO$_2$ specific capacity versus cycle number for a 2032 coil cell manufactured with a secondary battery active cathode material including a new synthetic manganese oxide τ-MnO$_2$ according to a non-limiting embodiment of the invention.

FIG. 6 indicates smooth voltage profile and FIG. 7 confirms stable charge-discharge for 150 cycles for the coin cells including the secondary battery active cathode material made with the new synthetic manganese oxide material τ-$MnO_2$ according to an embodiment of the invention.

While the invention has been described in detail herein in accordance with certain preferred embodiments, modifications and changes therein may be affected by those skilled in the art without departing from the spirit of the invention. Accordingly, it is the intent to be limited only by the scope of the appending claims and not by way of the details and instrumentalities describing the embodiments shown herein.

It is to be understood that variations and modifications can be made on the compositions, articles, devices, systems, and methods without departing from the concepts of the present invention, and further it is to be understood that such concepts are intended to be covered by the following claims unless these claims by their language expressly state otherwise.

A wide range of further embodiments of the present invention is possible without departing from its spirit and essential characteristics. The embodiments as discussed here are to be considered as being illustrative only in all aspect and not restrictive. The following claims indicate the scope of the invention rather than the foregoing description.

What is claimed is:

1. A composition of matter comprising:
a material having a general formula of $MnO_{2-x}$;
wherein x is in a range of 0 to 0.35;
wherein the material is crystalline; and
wherein the material has an X-ray diffraction pattern according to the following table:

| 2 Theta (+/−0.20) | Relative Intensity |
| --- | --- |
| 19.74 | Strong |
| 36.93 | Very Strong |
| 40.16 | Weak |
| 42.28 | Strong |
| 56.43 | Strong |
| 62.00 | Weak |
| 66.68 | Medium. |

2. The composition matter of claim 1, wherein the material has a space grouping of P$\bar{3}$m1.

3. The composition matter of claim 1, wherein the material has a distance between manganese atoms in the c-direction of about 4.487 Angstroms.

4. A method of preparing a crystalline material comprising manganese and oxygen, said method comprising a step of contacting a solid β-MnOOH with a component selected from the group consisting of an ozone species, a radical oxygen species, and a combination of the aforementioned species, in an absence of water, said crystalline material having after the contacting step an X-ray diffraction pattern according to the following table:

| 2 Theta (+/−0.20) | Relative Intensity |
| --- | --- |
| 19.74 | Strong |
| 36.93 | Very Strong |
| 40.16 | Weak |
| 42.28 | Strong |
| 56.43 | Strong |
| 62.00 | Weak |
| 66.68 | Medium. |

5. The method of claim 4, wherein the crystalline material has a space grouping of P$\bar{3}$m1.

6. The method of claim 4, wherein the crystalline material has a distance between manganese atoms in the c-direction of about 4.487 Angstroms.

7. A composition of matter comprising: a material defined by a general formula $MnO_{2-x}$, where x is in the range of 0 to 0.35; wherein the material is crystalline; and wherein the material has a space grouping of P$\bar{3}$m1.

8. The composition of matter of claim 7, wherein the material has a distance between manganese atoms in c-direction is about 4.487 Angstroms.

9. A method of preparing a crystalline material comprising manganese and oxygen, said method comprising a step of contacting a solid β-MnOOH with a component selected from the group consisting of an ozone species, a radical oxygen species, and a combination of the aforementioned species, in an absence of water for forming the crystalline material having a general formula $MnO_{2-x}$, where x is in the range of 0 to 0.35; and wherein the crystalline material has a space grouping of P$\bar{3}$m1.

* * * * *